United States Patent [19]

Scordato et al.

[11] Patent Number: 4,821,586

[45] Date of Patent: Apr. 18, 1989

[54] PROGRAMMABLE PIPETTE

[75] Inventors: Richard E. Scordato, Mount Kisco; George Fried, Tarrytown, both of N.Y.

[73] Assignee: Medical Laboratory Automation, Inc., Pleasantville, N.Y.

[21] Appl. No.: 160,391

[22] Filed: Feb. 25, 1988

[51] Int. Cl.[4] ........................ B01L 3/02; G01N 1/14; G01F 25/00

[52] U.S. Cl. ................................ 73/864.18; 73/1 H; 73/864.16; 364/496

[58] Field of Search .................... 73/864.16, 864.18, 3, 73/1 H, 864.17, 864.13; 364/496

[56] References Cited

U.S. PATENT DOCUMENTS

| | | | |
|---|---|---|---|
| 3,853,012 | 12/1974 | Scordato et al. | 73/864.16 X |
| 3,915,651 | 10/1975 | Nishi | 73/864.16 |
| 3,972,683 | 8/1976 | Lape | 73/864.16 X |
| 3,991,616 | 11/1976 | Stahli | 73/864.16 X |
| 4,367,043 | 1/1983 | Sweet et al. | 356/338 |
| 4,369,665 | 1/1983 | Citrin | 73/864.18 |
| 4,433,795 | 2/1984 | Maiefski et al. | 222/144.5 X |
| 4,475,666 | 10/1984 | Bilbrey et al. | 73/864.16 X |
| 4,563,907 | 1/1986 | Johnson, Jr. et al. | 73/864.16 |
| 4,598,840 | 7/1986 | Burg | 73/864.16 |
| 4,671,123 | 6/1987 | Magnussen, Jr. et al. | 73/864.16 |

*Primary Examiner*—Tom Noland
*Attorney, Agent, or Firm*—William P. Keegan

[57] ABSTRACT

A pipette system in which a pipette is controlled by a pre-programmed control unit to perform any selected one of a number of liquid dispensing functions, such as pipetting single volumes of liquid, multiple dispensings from an aspirated volume of liquid, dilutions, and titrations. The control unit also permits new programs for liquid dispensing functions to be written and stored therein.

17 Claims, 8 Drawing Sheets

NEW PROGRAM MODE

PROGRAMMABLE PIPETTE

FIELD OF THE INVENTION

This invention relates to pipettes, and more particularly to programmable pipettes that are capable of performing any selected one of a plurality of liquid dispensing functions.

Pipettes have in recent years become increasingly sophisticated. From mechanical pipettes, such as those of the type shown in U.S. Pat. Nos. 3,853,012 and 3,933,048, in which the volume of liquid aspirated and dispensed is dependent on the manually actuated stroke or displacement of a piston moving between fixed stops, pipettes have developed in which the stroke of the piston is controlled by a stepping motor, as shown in U.S. Pat. No. 3,915,651. As described in this latter patent, very precise and minute displacements of the piston may be effected by pulsing the stepping motor. U.S. Pat. No. 4,369,665 also discloses a pipette having a piston that is translated linearly by a stepping motor and lead screw drive assembly. In addition to the usual pipetting function in which a predetermined volume of liquid is aspirated and discharged, the patent also discloses how to effect dilutions in which a predetermined volume of one liquid is aspirated followed by the aspiration of a predetermined volume of a second liquid and the discharge of both liquids whereby the first liquid is diluted by the second liquid. U.S. Pat. No. 4,671,123 discloses a still more versatile pipette system that, in addition to fixed volume pipetting and dilutions, also will aspirate a fixed volume from which a number of equal parts thereof are serially dispensed, or perform titrations.

GENERAL DESCRIPTION OF THE INVENTION

It is the object of the invention to provide an improved pipette apparatus.

It is an object of the invention to provide an instrument or apparatus that is capable of performing any one of a plurality of liquid dispensing functions that might be suitable and required for clinical laboratory procedures.

It is another object of the invention to provide a computer controlled pipette apparatus.

It is still another object of the invention to provide a programmable pipette apparatus.

It is yet another object of the invention to provide a portable hand-held pipette that is operable in response to a separate programmable control unit.

It is another object of the invention to provide a liquid dispensing apparatus in which the rate of liquid dispensing can be varied.

It is still another object of the invention to provide a liquid dispensing apparatus in which the volume of liquid dispensed can be varied automatically to compensate for variations in the temperature or viscosity of the liquid, or for variations in general atmospheric conditions such as air pressure or temperature.

Yet another object of the invention is to provide a readily calibratable pipette.

In carrying out the invention, a pipette comprising a nozzle unit having a movable piston that is reciprocated to control the volume of liquid aspirated and dispensed is removably connected to a handle unit that includes an operating or start switch, position and other sensing elements, a stepper motor, and a reciprocating drive assembly that drives the pipette piston in a liquid dispensing direction. The piston is moved in the liquid aspirating direction preferably by spring means which move the piston to a position determined by the drive assembly.

The handle unit is electrically connected to a control unit having certain fixed programs stored therein for performing prescribed liquid dispensing functions and which is programmable for still other liquid dispensing tasks. The control unit is also provided with a display and a key pad or keyboard having numerical keys for entering data on liquid volumes to be aspirated and dispensed and other function keys which facilitate setting the control unit to perform pre-programmed functions, or to write new programs for still other liquid dispensing functions.

Features and advantages of the invention may be gained from the foregoing and from the description of a preferred embodiment hereof which follows.

DETAILED DESCRIPTION OF THE INVENTION

Figure 1:
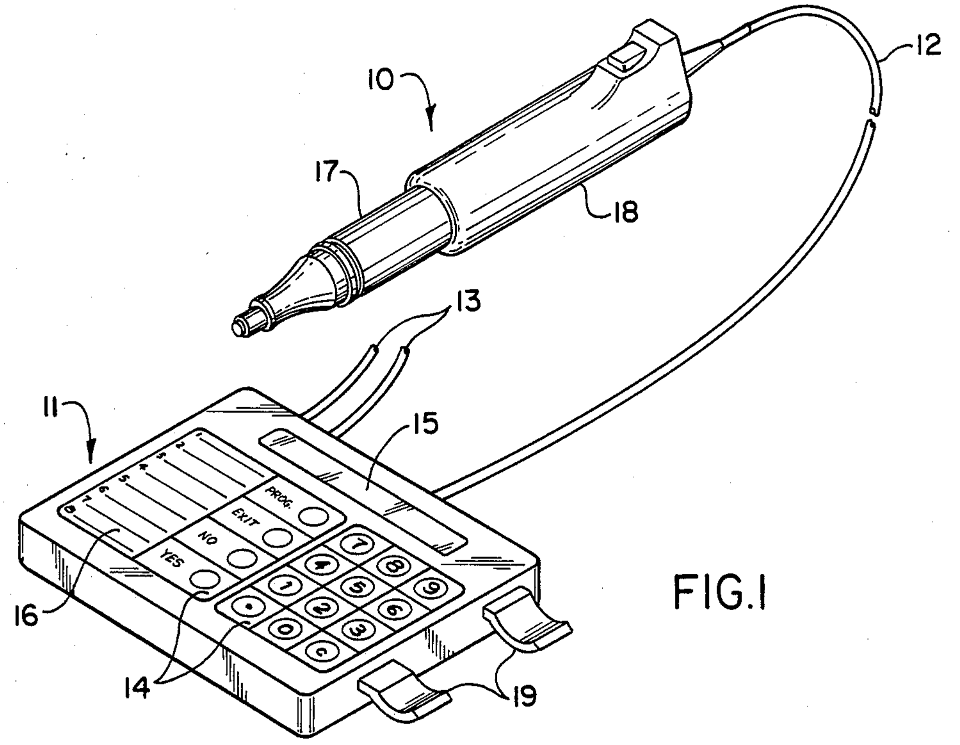
FIG. 1 is a schematic illustration of the invention showing the pipette and the control unit.

Referring now to the drawing, the present invention is shown in FIG. 1 where the pipette 10 is shown connected to the pipette control unit 11 by a flexible electrical cable 12. The control unit, in turn, is provided with a power cord 13 whereby it is connected to a source of electric power. An on-off power switch (not shown) is, of course, provided. Control unit 11 is provided with a keypad 14 for selecting a pipette operating mode from several such modes pre-programmed into control unit 11 and for entering certain data, e.g., pipette volumes, for the selected operating mode into the system, and a display screen 15 on which certain information is displayed to enable an operator to enter data into the system. A writing surface 16 is also provided so that a technician can jot down information to associate the various pipette operating modes with a program identification number. Thus, program number "1" may be a regular liquid dispensing operation, program number "2" a multi-dispense operation, program number "3" a titration operation, program number "4" a program written into control unit 11 and used by a particular technician for a pipette operation that he frequently uses. The control unit and its display will be described hereinafter when the electrical details of control unit 11 are considered in conjunction with the various programmed operating modes for pipette 10. Pipette 10 itself comprises a nozzle assembly 17 and a handle assembly 18. When not in use pipette 10 can be placed on cradle arms 19 provided on control unit 11.

Figure 2:
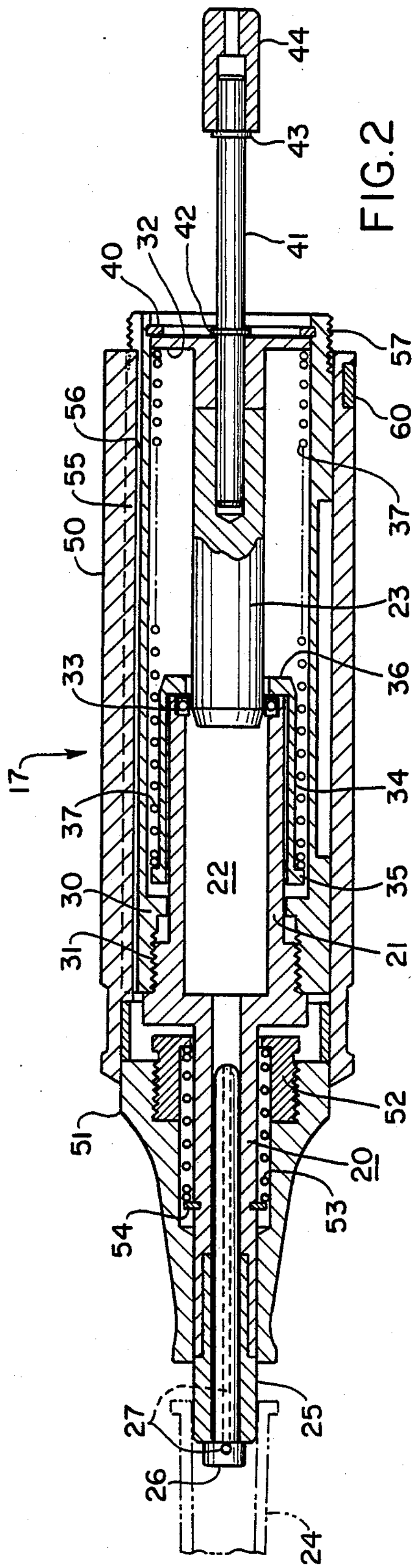
FIG. 2 is a longitudinal sectional view of the pipette nozzle assembly.

The nozzle assembly 17 is shown in detail in FIG. 2 to which reference is now made. The pipette nozzle 20 comprises an aluminum cylindrical barrel section 21 having an air chamber 22 in which the piston 23 is reciprocated to aspirate and discharge a liquid into and out of a disposable tip 24 frictionally secured in an air tight manner on the smaller diameter tip end 25 of barrel section 21. The tip end 25 is preferably a stainless steel member press fitted or bonded to aluminum barrel section 21. The use of stainless steel minimizes the likelihood of damage, such as dents and nicks, which might prevent the air tight fit required when a disposable tip 24 is placed on tip end 25. A plastic insert 26 having an aperture 2 communicating with air chamber 22 is provided to reduce the amount of excess air in chamber 22.

A tubular nozzle body 30 is internally threaded at its forward end 31 and is screwed on to a threaded segment of barrel section 21. The inside surface of body 30 is provided with a fine finish so that the piston guide 32 can slide smoothly therein as the piston 23 is reciprocated to aspirate and discharge liquid into and out of a disposable tip 24. Piston 23 is itself guided for movement in air chamber 22 by a seal 33 seated on a shoulder formed at the end of barrel section 21. To assure that there is no air leakage from air chamber 22 around piston 23, the piston is chrome plated stainless steel and is provided with a very fine mirror finish, and seal 33 is a Teflon ring having a channel shaped section in which a garter spring is placed to bias the seal into air tight contact with piston 23.

A seal retaining cap 34 is provided with a flange 35 that is outwardly directed towards the inner wall of nozzle body 30. An inwardly directed flange 36 at the other end of cap 34 overlays seal 33 so that compression spring 37, which extends between flange 35 and piston guide 32, biases cap 34 against seal 33 to keep the seal in position in the shoulder at the end of barrel section 21. Piston guide 32, which is rotatable on the piston rod 41 so that as spring 37 is compressed it will not cause guide 32 to bind in nozzle body 30, is kept within nozzle body 30 by a retaining ring 40 that is snapped into an annular groove formed on the internal wall of nozzle body 30 near its distal end.

The piston 23 is bonded to the piston rod 41 and abuts guide 32 which in turn abuts a C-ring 42 snapped into an annular groove formed on rod 41. A second C-ring 43 located near the other end of rod 41 determines the position of bearing piece 44 which is press fitted or bonded to rod 41. The distance from the free end of piston 23 to the free end of bearing piece 44 is established by the positioning of C-rings 42 and 43 and the manufacturing tolerances for the lengths of piston 23, piston guide 32, and bearing piece 44.

A longitudinally movable tubular sleeve 50 is bonded to a de-tipping member 51 which is fitted over the tip end 25 of nozzle 20. A spring retaining cap member 52 is threaded into the end of member 51 so that a compression spring 53, which is placed between a C-ring 54, positioned an annular groove formed on nozzle 20, and cap member 52 resiliently urges de-tipping member 51 and sleeve 50 away from the tip end of nozzle 20. Such movement is limited by the engagement of cap member 52 and the shoulder formed by the larger diameter part of barrel section 21. A key member 55 provided on the inside wall of sleeve 50 cooperates with a longitudinal keyway formed on the outer surface of nozzle body 30 to permit longitudinal sliding movement of sleeve 50 and de-tipping member 51 on nozzle body 30.

It is noted at this time that the pipette of the present invention is intended to operate with a fixed stroke piston so that when a pipette having a larger or smaller volume capacity is to be used the entire nozzle assembly 17 is removed from handle assembly 18 and replaced by a new nozzle assembly having the desired capacity. Thus, the end of nozzle body 30 is provided with a threaded segment 57 so that the nozzle assembly 17 can be screwed into handle assembly 18. Key member 55, previously mentioned, permits assembly nozzle body 3Q to be rotated for attachment to handle assembly 18 when sleeve 50, which is the only accessible part of nozzle assembly 17, is rotated. A different capacity nozzle assembly will simply have a different diameter piston 23, and other parts properly sized to accommodate that piston. For example, if nozzle assemblies of 50 uL., 200 uL., and 1000 uL. capacity are provided to cover a range of pipette volumes that can be dispensed, since each piston will undergo the same length of stroke to dispense the maximum volume for the nozzle assembly, the piston of the 50 uL. nozzle assembly will have a piston cross-sectional area ¼ that of the 200 uL. nozzle assembly and 1/20 that of the 1000 uL. nozzle assembly.

Sleeve 50 may be marked to indicate the volume capacity of the nozzle assembly 17, or it may be provided with code means that are machine readable by a detector mechanism in handle assembly 18. Thus, a magnet array 60 could be provided to actuate Hall Effect switches mounted in the handle assembly.

Figure 3:
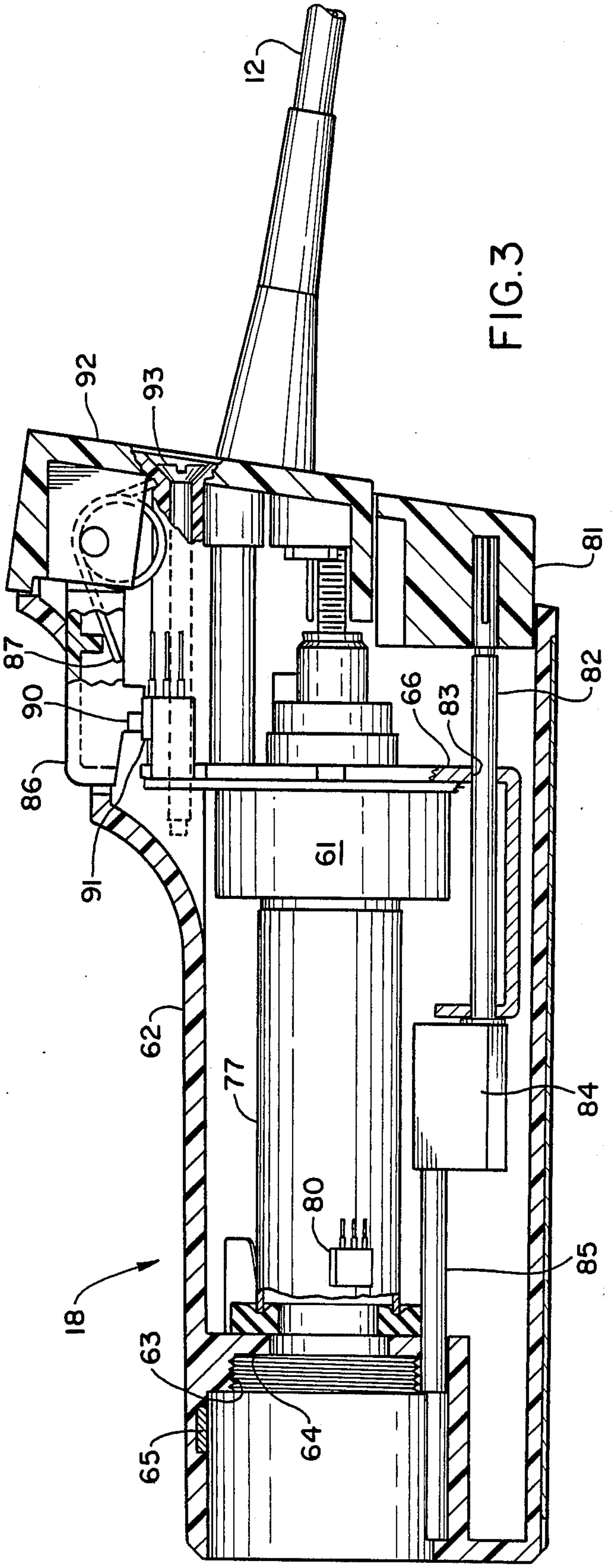
FIG. 3 is a front elevational view, partly in section, of the pipette handle assembly.
Figure 4:
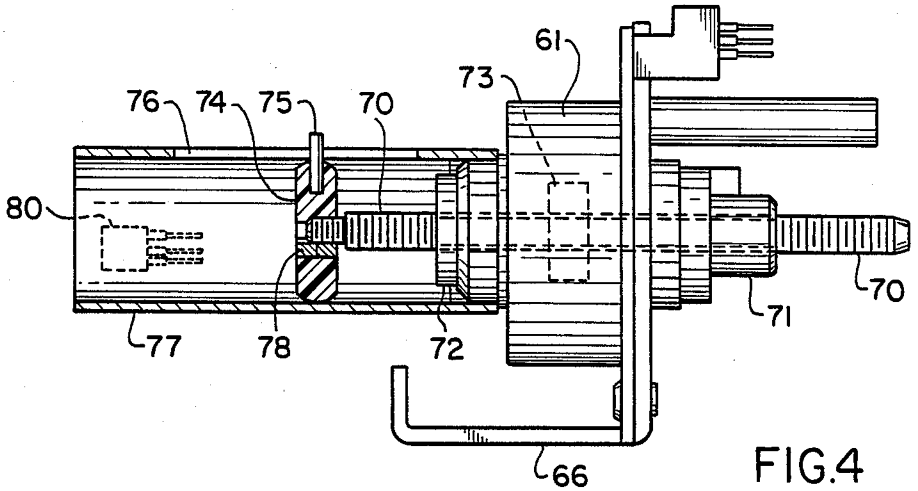
FIG. 4 is a front elevational view, partly in section, of the pipette motor drive mechanism.
Figure 5:
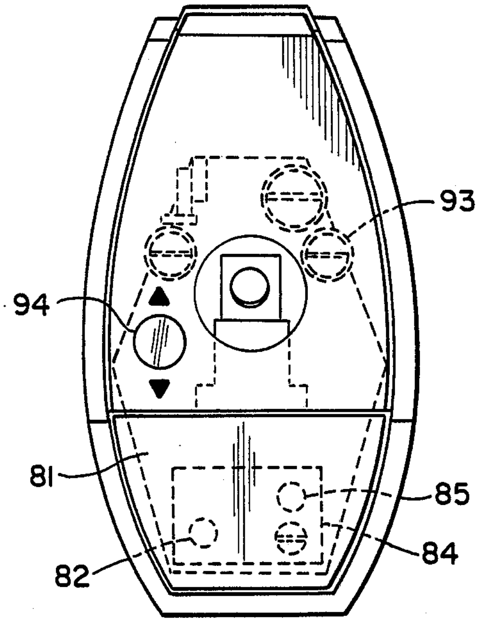
FIG. 5 is a plan view, partly in section, of the pipette handle assembly.

Attention is now directed to FIGS. 3, 4, and 5 for a description of handle assembly 18. In general, this assembly includes a stepper motor 61 which drives piston 23 downwardly in the nozzle assembly, i.e., to the left in FIG. 2, to a home position. The piston moves to its retracted position under the urging of spring 37, but the exact retracted position will be determined by the number of steps motor 61 takes to allow spring 37 to move the piston. It is noted that in the preferred embodiment of the invention, the fixed stroke of the piston to aspirate and to dispense the maximum volume of liquid from any nozzle assembly will be 0.8 inches and will require 800 steps to be taken by motor 61. Each pulse to the motor will advance the piston 0.001 inches. Thus, each pulse to motor 61 will advance the motor one step and a piston 0.001 inches to dispense 50/800 or 1/16 uL. from the 50 uL. nozzle assembly, 200/800 or ¼ uL. from the 200 uL. nozzle assembly, and 1000/800 or 1¼ uL. from the 1000 uL. nozzle assembly.

Assembly 18 is provided with a hollow plastic handle member 62 that is internally threaded at collar segment 63 so that nozzle body 30 of assembly 17 can be threaded therein into abutting relationship with annular shoulder 64. A Hall Effect switch means 65 may be mounted in member 62 to detect the volume code provided by magnets 60.

Within member 62 a sheet metal bracket 66, on which stepper motor 61 is mounted, is secured by a pair of screws, not shown. Motor 61 may be of the type manufactured by Airpax Inc. Such motors comprise a threaded shaft 70 supported by close fitting guide bushings 71 and 72. Within motor 61 a nut 73 secured to the motor armature is threaded on shaft 70. The nut 73 steps rotationally with the armature as the motor windings are pulsed. A plastic member 74 bonded to the end of motor shaft 70 is provided with a projecting pin 75 that extends through an elongated slot 76 formed in the tubular member 77. The tubular member is attached to the casing of motor 61. Since threaded shaft 70 cannot rotate because of pin 75 extending through slot 76, the shaft 70 will advance or retreat past nut 73 depending on the direction of rotation of the nut. Of course, other type stepper motors, and anti-rotation arrangements other than pin 75 and slot 76, may be used.

The movement of shaft 70, and member 74, will control the movement of piston 23 in nozzle assembly 17 because when nozzle assembly 17 is connected to handle assembly 18 as by screwing threaded segment 57 of nozzle body 30 into threaded collar segment 63 of handle assembly 18, bearing piece 44 will abut plastic member 73. Thus, when pipette 10 is assembled by connecting a nozzle assembly 17 to handle assembly 18, as motor 61 is pulsed, piston 23 will be moved in air chamber 22. The number of pulses applied to the windings of motor 61 will determine the number of steps nut 73 rotates and the distance shaft 70 moves, thus determining the stroke of piston 23 and the volume of liquid aspirated into the disposable tip mounted on the pipette.

Magnets 78 are provided on the periphery of member 74 and they cooperate with Hall Effect switch 80 mounted on the outside surface of tubular member 77 to indicate that member 74 is at its home position and, since bearing piece 44 of the piston assembly is urged into abutting relationship with member 73 by spring 37, that piston 23 is in its home position ready for movement to aspirate or pick up liquid into a disposable tip 24.

A de-tipping button 81 that is depressed to move sleeve 50 and de-tipping member 51 against the bias of spring 53 to remove a disposable tip from the pipette nozzle is slideably positioned in handle member 62. A rod 82, press fitted into button 81, extends through guide holes 83 provided in mounting bracket 66 into offset block 84. A second rod 85 projecting from block 84 and offset from rod 82 is positioned to engage sleeve 50 when nozzle assembly 17 is threaded into handle assemble 18 at threaded segment 63.

A starting switch trigger 86 is pivotally mounted in member 62 and is biased by a spring 87 to a non-operating position. Trigger 86 carries a magnet 90 which, when trigger 86 is pivoted, actuates Hall Effect switch 91 to initiate a pipetting operation as will be described when the electrical control circuits are hereinafter considered.

The end of electrical cable 12, which carries the electrical conductors to the various electrical components mounted in handle assembly 18, is secured to the handle cap 92 with the conductors extending to the components within. A screw 93 secures cap 92 and motor mounting bracket 66 to handle member 62. A two element pilot light 94 is also provided in cap 92. A green light element is illuminated to indicate that piston 23 is in the home position and the pipette is ready to aspirate or pick up a liquid sample. A red light element indicates that the pipette is loaded with a liquid ready for dispensing. When both light elements are illuminated, i.e., a yellow signal, it is an indication that the pipette is ready to pick up an air bubble to separate two liquid samples.

Figure 6:
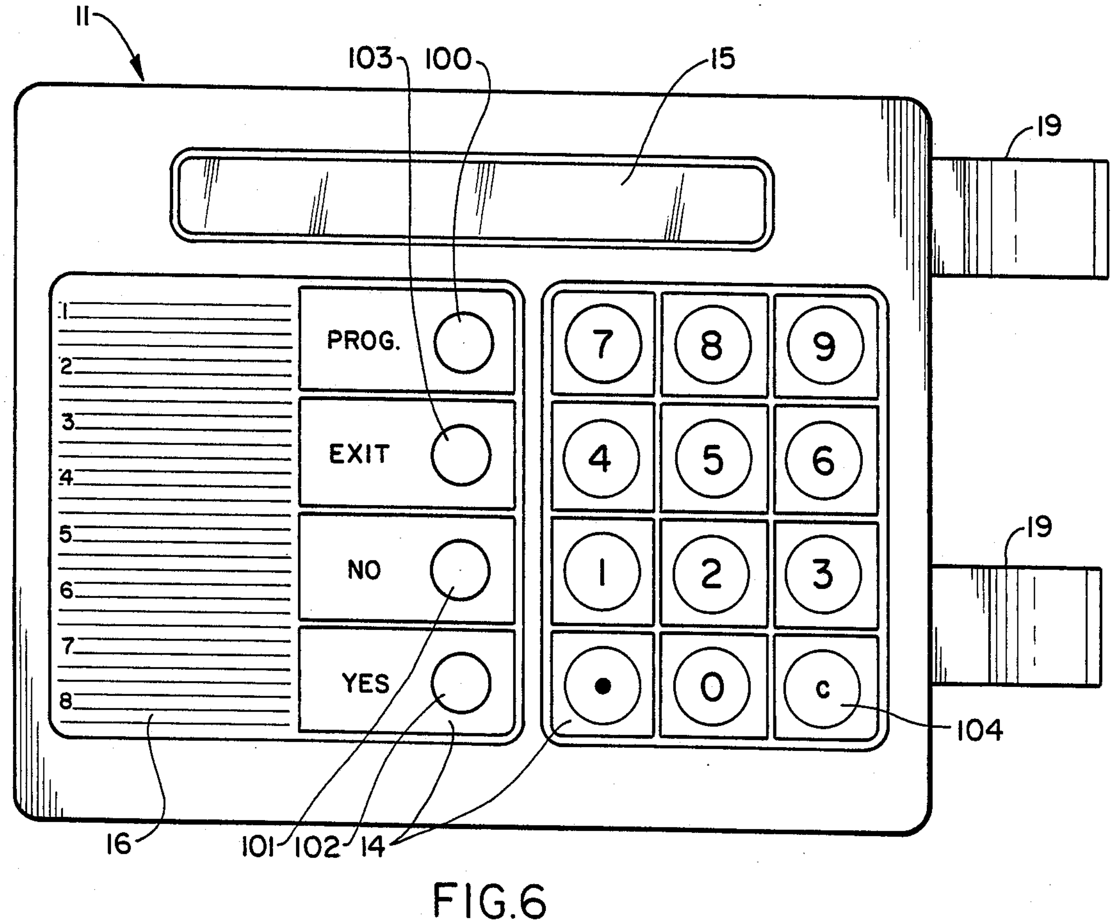
FIG. 6 is a plan view of the control unit key pad and display.

Attention is now directed to FIG. 6 which shows the control unit 11, especially the numeric and control keys by which the technician using pipette 10 will respond to the questions or information that appears on display screen 15 in response to the operation of those keys and the programmed information which is sequentially displayed once a mode of pipette operation is determined and selected.

A program key 100 is provided to select one of the modes of pipette operation programmed in control unit 11. A "no" key 101 and a "yes" key 102 are also provided to enable the technician to respond negatively or positively, respectively, to a question displayed on screen 15. Also, an "exit" key 103 and a "clear" key 104 are provided. These keys will be further explained when the various pipette programs are disclosed hereinafter.

The numeric keys 0–9 are self explanatory and will be mentioned later when particular programmed modes of operation are described. In general they enable pipette volumes and other numeric information to be entered into the control components of unit 11.

Figure 7:
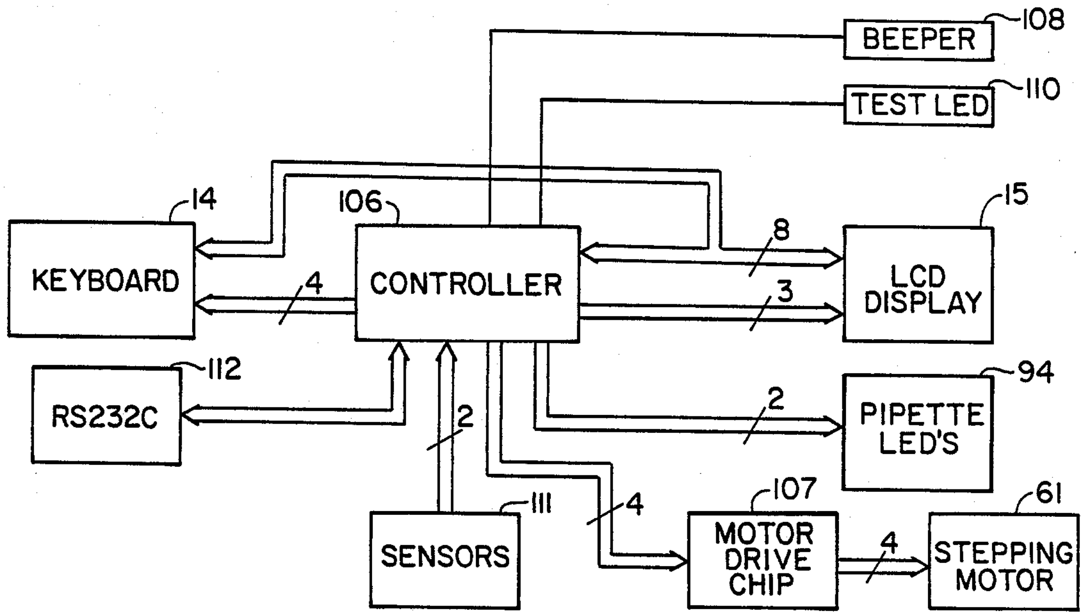
FIG. 7 is a schematic diagram showing the architecture of the control unit.

In FIG. 7 the pipette system architecture is shown in block diagram form to illustrate how the control unit hardware and programmed software interact so as to provide the type of pipette operation called for by the technician. Central to the system is Intel 80C52 8K byte controller 106 in which the software for all the various pipette programs is stored along with the functional signals that will control the operation of the pipette system. Controller 106 is connected to the numeric and control keys of keyboard 14 and to the display 15 of control unit 11. The keyboard may be a KB Denver Inc. unit and the preferred display is a Hitachi LM027 display. Of course, other keyboards and displays, as well as a controller other than the Intel unit, could be used. The controller also has outputs to the motor drive microchip 107 (Sprague ULN2064B) for driving stepping motor 61. Additional outputs from controller 106 go to a beeper 108, a test LED 110, and pipette LED's 94. The latter LED's indicate the position of the pipette piston as previously described when the mechanical features of the pipette were disclosed.

Inputs to controller 106 are shown in FIG. 7 as sensors 111. More particularly, they are pipette switch 91 which initiates pipette operations, and Hall Effect switch 80 which signals when the pipette piston is in the home position. The home position will be defined when pipette operations are later described.

An RS232 microchip interface 112 (Maxim MAX232) is provided to permit connection of controller 106 to a remote control unit. If the remote unit is a computer, the number of pipette operating modes would be determined by the computer and not by the memory capacity of controller 106.

The pipette operating modes generally contemplated in the presently disclosed system and programmed into controller 106 are illustrated in FIGS. 8 to 16. In the various figures the letter "Y" indicates that the "yes" key 102 should be actuated to advance to the next stage or step in the program, the letter "N" that actuation of the "no" key 101 will result in the step indicated, the letters "C" and "E" that actuation of the "clear" key 104 and the "exit" key 103, respectively will result in the programmed steps indicated. Also, information shown in the blocks or rectangles is the same as that displayed on display 15 at the particular point in the sequence of pipette operations indicated. For example, referring to FIG. 8, when pipette 10 is connected by cable 12 to control unit 11 and control unit 11 connected by power cord 13 to a power source and the apparatus is switched on by actuation of the on-off power switch (not shown), beeper 108 sounds and display 15 shows the calibration factor "CAL" to be 1.000, the intake speed "I" to be 100%, the dispensing speed "D" to be 100%, and the programmed pipette operating mode to be forward dispense "FD". These are factory settings and indicate that the pipette will dispense a volume of liquid equal to one times the volume programmed by the technician, the stepping motor will step to aspirate (intake) and dispense liquid at the normal motor stepping speed of 400 steps per second for the 1000 uL. pipette, and that the operating mode for the pipette is a forward dispense mode. This mode will be defined hereinafter. The programming may be such that the display just mentioned will come on only if one of its components differs from the factory setting. In such a case it will remind the technician that a change had been made in one of the settings and is now programmed into the system, and that it should be changed if a change is necessary.

Figure 8:
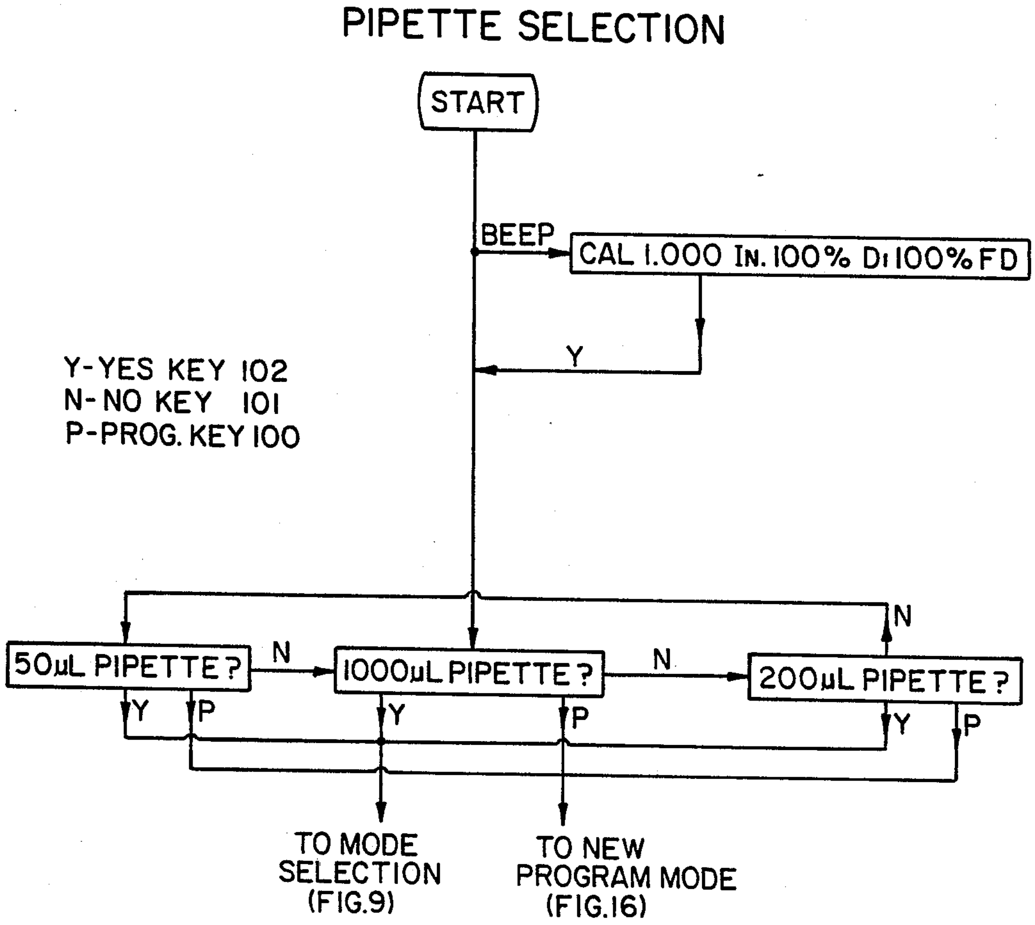
FIGS. 8 to 16 are flow charts showing the Various input and operating steps that are carried out in performing the liquid dispensing functions of which the present invention is capable.
Figure 9:
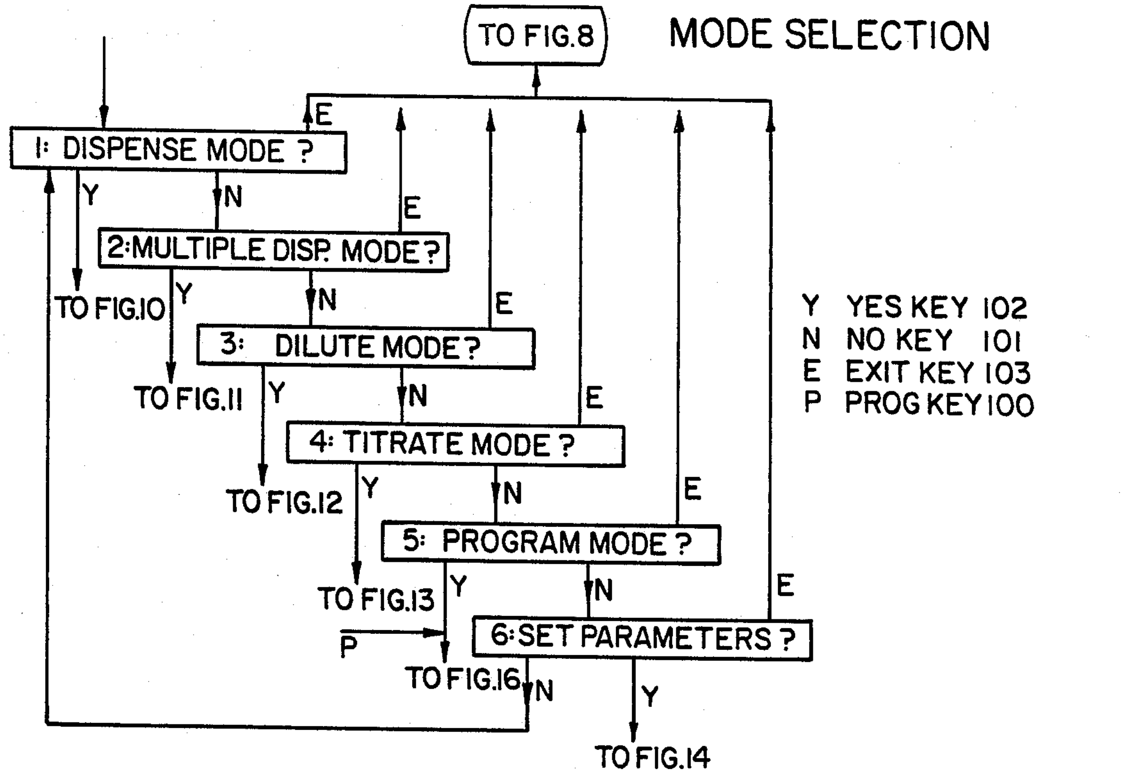

The various factors mentioned can be changed as later described, but for the present it is assumed that they are the factors preferred in the operation of the pipette. Referring to FIG. 8, the technician will depress "yes" key 102 whereupon the display changes to "1000 uL.?" If the technician intends to work with a pipette having a pipette nozzle assembly 17 having a different capacity, e.g., a 50 uL. nozzle assembly that can dispense a maximum of 50 uL., he actuates the "no" key 101. The display then shows "200 uL.?" He actuates the "no" key again and the display changes to "50 uL.? " He then actuates "yes" key 102. Since the present system contemplates that a 50 uL., a 200 uL., and a 1000 uL. pipette nozzle assembly will be sufficient to provide for the full range of pipette volumes to be dispensed, only three pipette sizes are programmed to be displayed. If other size nozzle assemblies are to be used, controller 106 will be appropriately programmed to inquire about the other nozzle assembly capacities.

Once the technician makes the desired pipette size selection by actuating "yes" key 102 when the desired volume is displayed, the controller causes display (See FIG. 9) to read "1. Dispense Mode? " If this is not the desired operating mode, the "no" key 101 is actuated, and the display then reads "2. Multiple Dispense Mode? " If that is not the desired mode, the "no" key is actuated and the display is switched to read "3. Dilute Mode? " Actuation of the "no" key causes the display to read "4. Titrate Mode? " Actuation of the "no" key causes the display to read "5. Program Mode?". Again, actuation of the "no" key next causes the display to read "6. Set Parameters? " Actuation of the "no" key switches the display back to "1. Dispense Mode?", and the cycle of queries is repeated. At any point in the cycle, the pipette size selection (FIG. 8) display can be called up by depressing the "exit" key 103. Depression of a numeric key corresponding to a program mode will immediately call up that mode. For example, if the display reads "1. Dispense Mode?" actuation of numeric key "4" will cause the display to read "4. Titrate Mode?", or actuation of numeric key "3" will cause the display to read "3. Dilute Mode?". Also, the display "5. Program Mode?" can be immediately called up by actuating the numeric key "5" or by actuating the "Prog" key 100.

It will be assumed that when the display 15 shows "1. Dispense Mode?" the technician actuated "yes" key 102 to indicate that he wanted simply to aspirate and dispense a fixed volume of liquid for each pipette operation. Thereupon, the sequence of instructions shown in FIG. 10 will be implemented. Display 15 will read "Dispense Vol. 50 uL.", since the technician had selected the 50 uL. pipette nozzle assembly. As previously stated, the pipette capacity could be signaled by code means carried by the nozzle assembly. In either case, if the technician wishes to pipette a different volume, he will actuate the appropriate numeric keys 105 to input a number from 0.5 to 50 (The acceptable range is from 1% of pipette capacity to the pipette capacity.) into controller 106 depending on the volume of liquid he wishes to pipette. If he inputs a number outside the range indicated, beeper 108 will sound and the display will read "Volume from 0.5 to 50" to tell the technician that he should input a number suitable for the size pipette nozzle assembly he has selected. After a time period, e.g., 1.5 seconds, the display will again read "Dispense Vol. 50 uL."

If the technician had initially selected a 200 uL. pipette nozzle assembly, he could input a number from 2 to 200 when display 15 reads "Dispense Vol. 200 uL."; and if he inputs a number outside that range, beeper 108 will sound and the display will remind him that the number representing the volume of liquid to be dispensed should be between 2 and 200 uL. For the 1000 ml pipette, the acceptable range for the volume of liquid to be dispensed is from 10 to 1000 uL. In other words, the display will display a volume corresponding to the capacity of the pipette selected by the technician or signaled by code means carried by the nozzle assembly, and the technician can input a volume falling within the acceptable range.

It will be assumed that the technician wishes to pipette 40 uL. of a liquid. When he inputs that number to controller 106 by actuating the appropriate numeric keys 105, the display will change to read "Dispense Vol. 40 uL." The "yes" key 102 is actuated and the display changes to read "Clear Pipette". Pipette trigger 86 will then be depressed and released, indicated on the flow chart by the letters DT (depress trigger) and RT (release trigger), respectively. The "Clear Pipette" step causes the stepping motor 61 to be pulsed 20 times to cause piston 23 to move in the overblow direction 0.020 inches away from its home position and then pulsed 20 times again to take 20 steps in the opposite direction to return the piston to its home position and thereby clear the pipette tip of any liquid that may have been in it. Of course, a different number of steps could be programmed for the "Clear Pipette" operation.

The display will then read "Ready to Intake" and the green LED of pilot light 94 Will be illuminated to indicate that piston 23 is in its home position and ready to aspirate a liquid into pipette tip 24. It will be recalled that each step taken by stepping motor 61 advances the piston 0.001 inches and dispenses 1/16 uL. when the 50 uL. nozzle assembly is used, ¼ uL. when the 200 uL. nozzle assembly is used, and 1¼ ml when the 1000 uL. nozzle assembly is used. Thus, depression and release of pipette trigger 86 will cause stepping motor 61 to be pulsed 640 times, thus moving the pipette piston 0.640 inches away from its home position and aspirating 640 times 1/16 uL. or 40 uL. of liquid into pipette tip 24. After the liquid is in tip 24, display 15 will read "Ready to Dispense" and the red LED of pilot light 94 will be illuminated to indicate that there is liquid in the pipette tip that can be dispensed. Depression and release of trigger 86 will then cause motor 61 to step 640 steps in the opposite direction to dispense the liquid in tip 24 while returning piston 23 to its home position. Preferably, controller 106 will be programmed so that in the dispensing phase of the pipetting cycle motor 61 will be pulsed an additional number of times to drive piston beyond its home position and thereby achieve an overblow effect to assure that all of the liquid is dispensed from tip 24. After the overblow, piston 23 is automatically returned to its home position to be ready for another pipetting operation.

It might be noted at this time that the home position is indicated by the actuation of Hall Effect switch 80. The precise location of the home position, i.e., the starting position of piston 23, is not too important since the volume of liquid aspirated and dispensed is not dependent on the piston moving between two fixed physical positions o stops, but rather on the number of pulses fed to motor 61 and the number of steps taken by the motor.

Actuation of "clear" key 104 at any time during the pipetting operation will restore the program to the "Clear Pipette" stage of the programmed cycle. Also, as is clear from the flow chart of FIG. 10, actuation of the "exit" key 103 at any time during the pipetting operation will cause the display 15 to query "1. Dispense Mode?" and thus enable the technician to select another pipette operating mode, if so desired.

Figure 10:
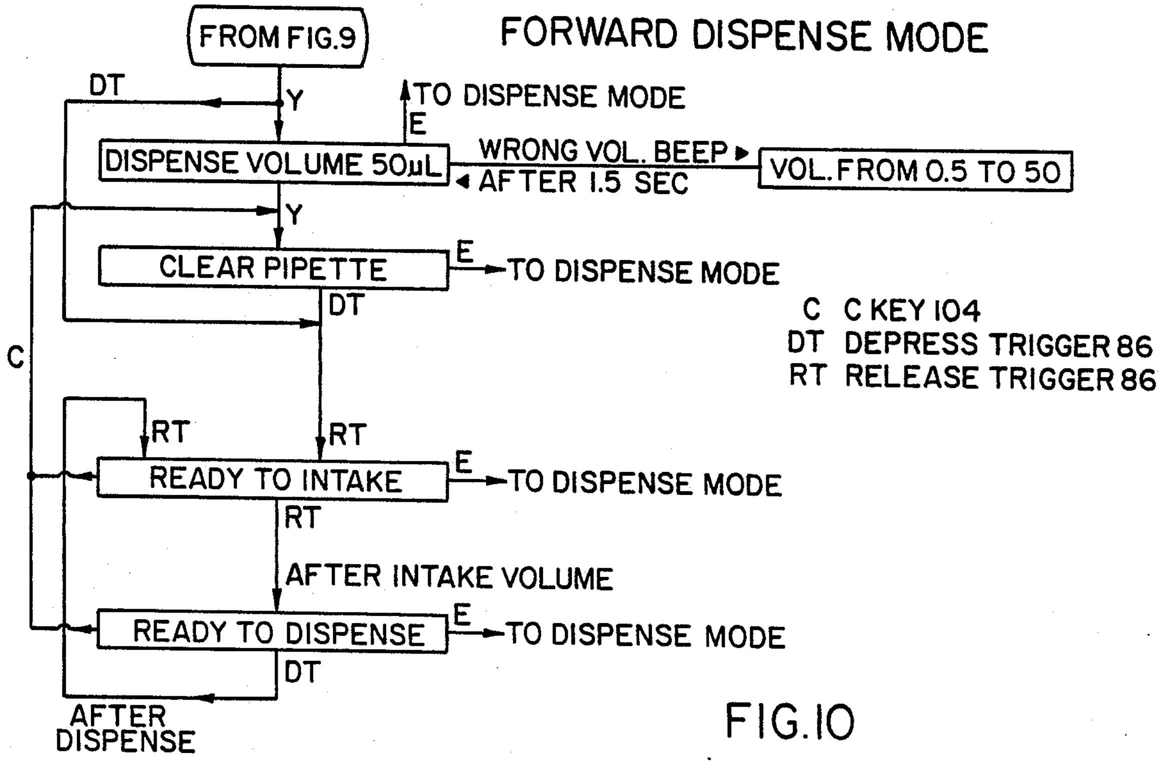
Figure 11:
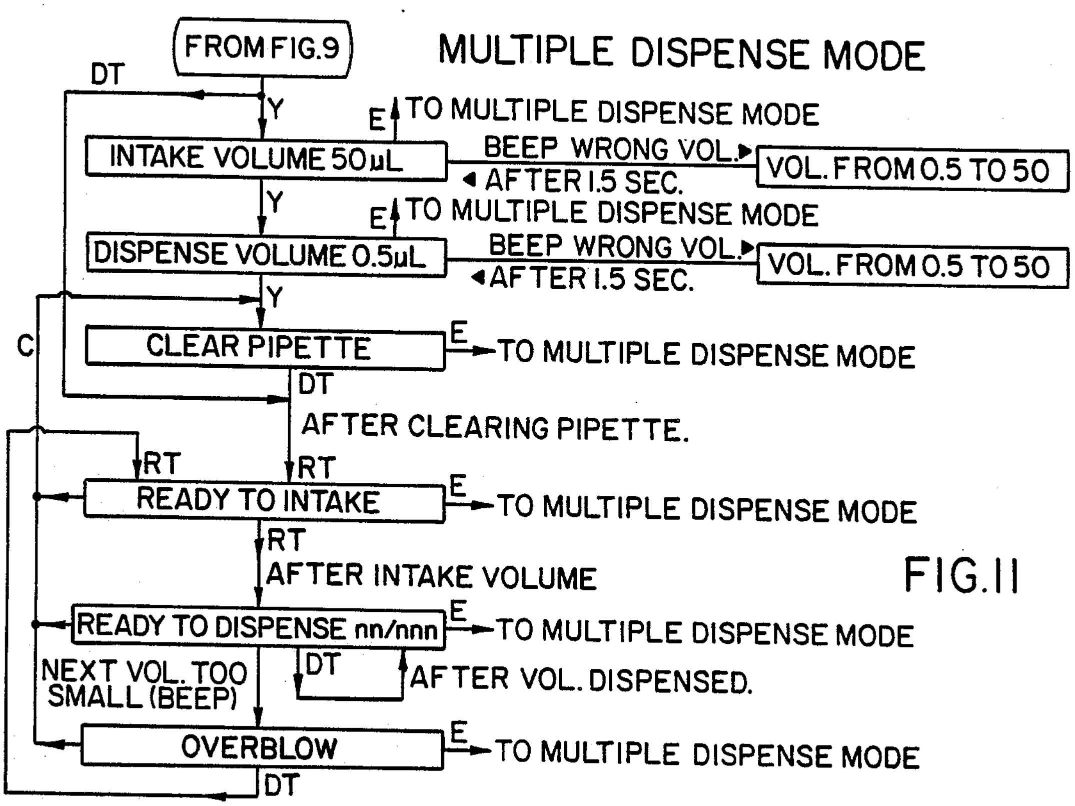

FIG. 11 illustrates the sequence of displays and key actuations required to perform a multiple dispense operation. Such an operation consists of aspirating a relatively large volume of liquid into a pipette tip and then dispensing that volume in a series of equal parts of that volume. For example, the technician may aspirate 50 uL. into the pipette tip with the intention of dispensing a series of 7 uL. volumes. In view of the detailed description of FIG. 10, it is believed that FIG. 11 is self-explanatory since the displays and key operations required are the same as those described in connection with the FIG. 10 flow chart. Thus, the display will first read "Intake Vol. 50 uL." Since that is the volume to be aspirated, the technician will actuate the "yes" key 102. When that is done, the display will read "Dispense Vol. 0.5 uL." (the minimum volume or 1% of the pipette capacity) and the technician will input the number for the volume to be dispensed on each actuation of pipette trigger 86, e.g., 7 uL.

The technician will then actuate the "yes" key 102, whereupon display 15 will read "Clear Pipette". The pipette will be cleared and the intake volume of liquid will be aspirated a previously described. In this mode, the pipette is programmed to intake slightly more than the specified volume and immediately and automatically dispense the excess back into the liquid supply so that the pipette tip contains only the specified volume of liquid. This assures that all "backlash" is taken out of the pipette and that the subsequent multiple dispenses are accurate. Display 15 will then read "Ready to Dispense". Thereafter, operation of pipette trigger 86 will dispense 7 uL. of liquid from the pipette tip. After the 7 uL. of liquid is dispensed, the display will read "Read to Dispense". This will continue for seven dispensing cycles, after which 49 uL. of the 50 uL. initially aspirated into the pipette tip will have been dispensed leaving only 1 uL. of liquid left in the pipette tip 24, not enough to provide a full 7 uL. measure of liquid as required. The technician is made aware of this fact by the sounding of beeper 108. The technician will discard this remaining liquid into a waste container by operation of trigger 86. Disposal of all of the remaining liquid is assured by piston moving to an overblow position and then back to its home position after which display 15 will read "Ready to Intake" and the operation of the pipette can be resumed as described.

Figure 12:
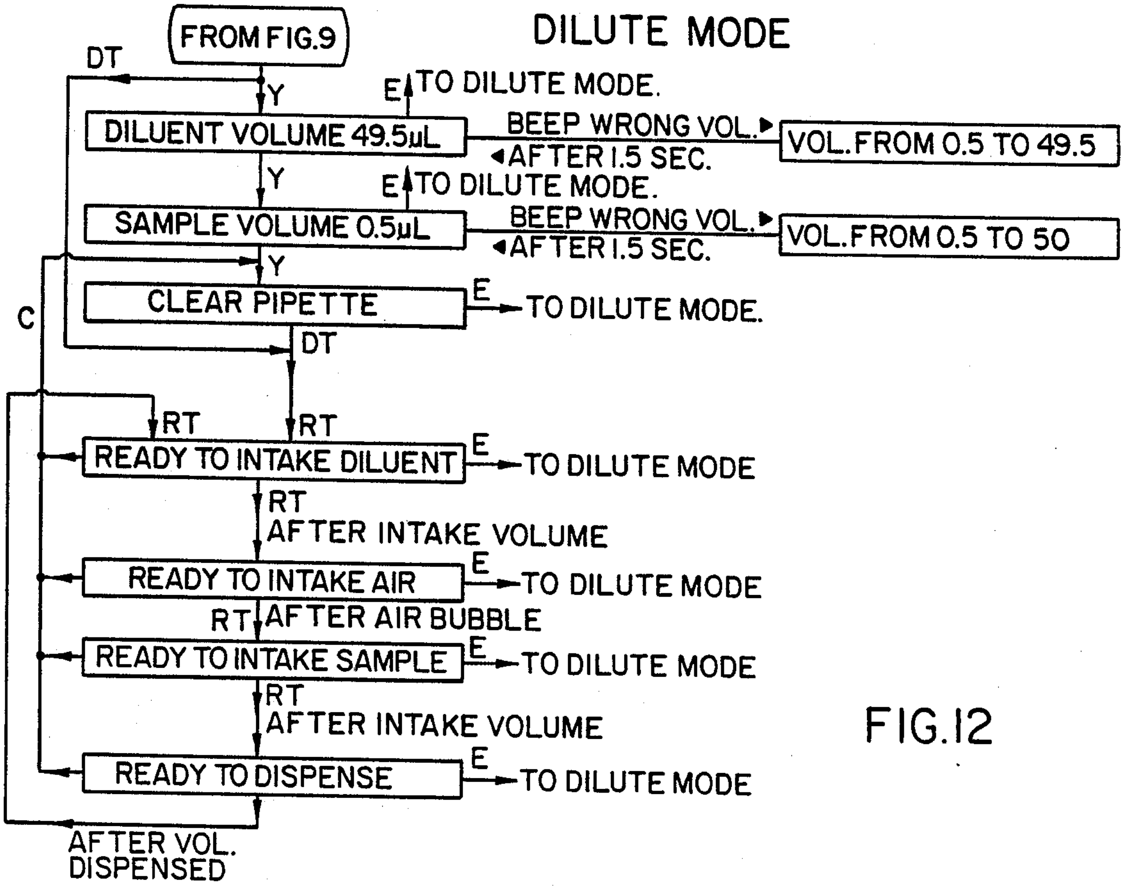

A flow chart for a dilution mode of pipette operation is shown in FIG. 12. Again this chart is believed self explanatory, particularly when a dilution operation is described. First, the dilution ratio is determined. For example, if 5 uL. of a sample is to be diluted with 30 uL. of a diluent, the desired diluent volume, i.e., 30 uL., is keyed in when display 15 reads "Diluent Vol. 49.5 uL." The display then changes to read "Diluent Vol. 30 uL." whereupon the "yes" key 102 is actuated to store the information in microprocessor 106. The display then changes to "Sample Vol. 0.5 uL." The desired sample volume, i.e. 5 uL., is keyed in, followed again by actuation of "yes" key 102. If the total volume keyed in for diluent and sample exceeds the pipette capacity, beeper 108 will sound and the technician will then key in suitable and acceptable numbers. Thereafter, successive actuations of pipette trigger 86 will clear the pipette, aspirate the desired volume of the liquid sample, aspirate a fixed volume air bubble, aspirate the desired volume of diluent, followed by the discharge of the sample and the diluent into a receptacle where the dilution takes place. The air bubble is always the same size or volume regardless of the sample and diluent volumes and is simply intended to separate the sample and the diluent liquids in the pipette tip. It may vary in size as between different capacity pipettes. For example, a 1000 uL. pipette may use a 30 uL. bubble while a 200 uL. pipette may use a 20 uL. bubble.

Figure 13:
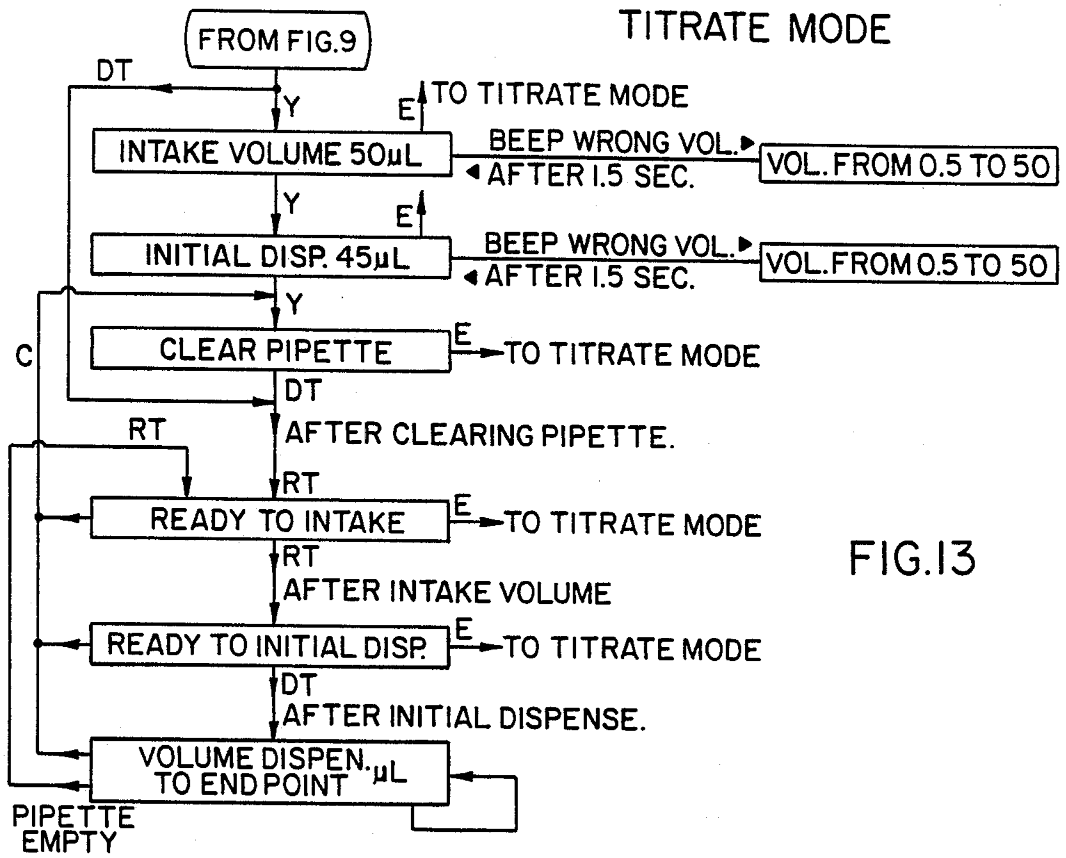

FIG. 13 shows a flow chart for a titration performed with the pipette system of the present invention. When the display 15 reads "Intake Vol. 50 uL." (still assuming that the technician is working with a 50 uL. pipette) the technician will key in the volume that he thinks will be slightly more than that required to reach a titration end point. Assume this to be 45 uL. This assures that the titration will be completed before the supply of reagent is exhausted. The display will then read "Initial Dispense 45 uL." and if the technician knows that at least a fixed part of the volume initially aspirated will be needed, that volume can be keyed into controller 106, or the initial dispense can be set at 0 uL. The clear pipette and the intake or aspirate steps are performed as previously described. If an initial dispense volume had been keyed into controller 106, the depression and release of pipette trigger 86 will cause that volume of liquid to be dispensed. Thereafter, the stepping motor 61 will step continuously at an ever increasing speed up to the maximum motor speed when trigger 86 is depressed and held in that position. The technician will release trigger 86 to stop the motor when he nears the titration end point. To reach the end point he will actuate trigger 86 and the motor will again start to step at a low but increasing speed as before. He can step the motor one step at a time by repeatedly depressing and releasing trigger 86. When the end point is reached, display 15 will indicate the total volume of liquid dispensed during the initial dispensing operation and the continuous dispensing operation, or in other words, the total volume of liquid dispensed to reach the end point. Excess reagent remaining in the pipette after the end point is reached may be discarded by continuous trigger actuations, or by actuating the "C" (i.e., clear) key 104 on control unit 11.

Figure 14:
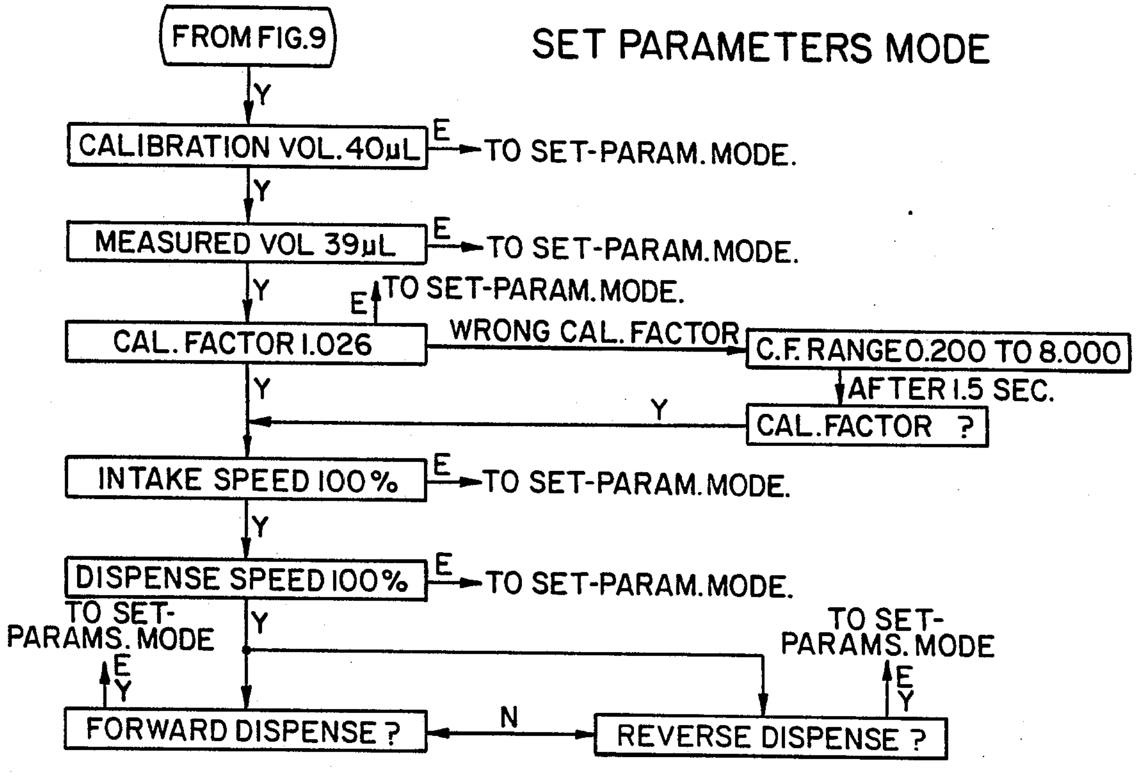

FIG. 14 shows the flow chart for changing the factory set parameters of calibration factor, intake speed, dispensing speed, and mode of dispense which were mentioned in connection with the FIG. 8 flow chart. These parameters can be changed by the program illustrated in FIG. 14. If, for example, the technician wants to dispense 40 uL. of a liquid, but he finds that the setting for 40 uL. (FIG. 10 operation) results in only 39 uL. being dispensed when he measures a dispensed volume, he will change the factory set calibration factor from 1.000 to 1.026. This is done by keying in a value of 40 when the display 15 reads "Calibration Vol. 50 uL." and a value of 39 when the display reads "Measured Vol. 50 uL." Controller 106 then divides 40 by 39 to arrive at a calibration factor of 1.026 which is then shown on display 15 as "Calibration Factor 1.026". The aspirating and dispensing of 40 uL. theoretically requires motor 61 to be pulsed 640 times in one direction to aspirate that volume and then 640 times in the other direction to dispense the aspirated liquid, but since it was found that the 640 pulses resulted in only 39 uL. being dispensed, controller 106 will multiply the theoretical number of pulses by the calibration factor to apply 656 pulses to the motor when aspirating and dispensing the liquid. The discrepancy between the calibration volume and the measured volume may be due to the viscosity or other properties of the liquid which may cause some of the liquid to remain in the pipette tip as a bubble or as a coating on the wall thereof. It should be noted at this time that if the calibration factor is set higher than 1.000, the technician can never input an intake volume equal to the maximum capacity of the pipette in use since such an input would call for a volume greater than the pipette capacity. In other words, he can input an intake volume which when multiplied by the calibration factor is less than or equal to the maximum pipette capacity. Otherwise, beeper 108 will sound and the display will read "Cannot Intake Specified Volume".

The normal or factory set operating speed of stepping motor ~~61~~ is 400 steps per second when aspirating and dispensing liquids. This normal speed may vary as between different size pipettes. For example, a smaller capacity pipette may aspirate and dispense at a higher speed. For certain liquids aspirating them into the pipette tip at that rate might cause foaming of the liquid or it might cause sediment to be disturbed and carried into the pipette tip. Other undesirable results might obtain if the aspiration rate for the liquid is too high. The intake or aspiration rate can be reduced to, e.g., 200 steps per second, by keying in the number 50 when display 15 reads "Intake Speed %". Similarly, the dispensing speed can be reduced if the normal dispensing speed of 400 steps per second is found to cause foaming or bubble formation or any other undesirable effect when a liquid is dispensed. Thus, the rates at which a liquid is aspirated and dispensed may be varied, and they can be different from each other.

Controller 106 is also set at the factory to effect what has been termed forward dispensing when a dispensing or regular pipetting operation is called for, as in the program illustrated in the FIG. 10 flow chart. In forward dispensing, the pipette piston 23 is driven a fixed distance to aspirate a desired volume of liquid into the pipette tip. To dispense that liquid the motor is stepped the same number of steps plus additional steps to achieve an overblow effect to remove all the liquid from the pipette tip.

Under certain circumstances it may be desired to aspirate into the pipette tip a volume of liquid larger than the volume to be dispensed and then to dispense only the required volume of liquid, leaving the excess liquid in the pipette tip from which it is discarded. This is called reverse dispensing, and it can be called for by changing the factory setting for forward dispensing. This is accomplished in the program illustrated in the FIG. 14 flow chart by actuating "no" key 101 when display 15 reads "Forward Dispense?" or "yes" key 102 when display 15 reads "Reverse Dispense?".

Figure 15:
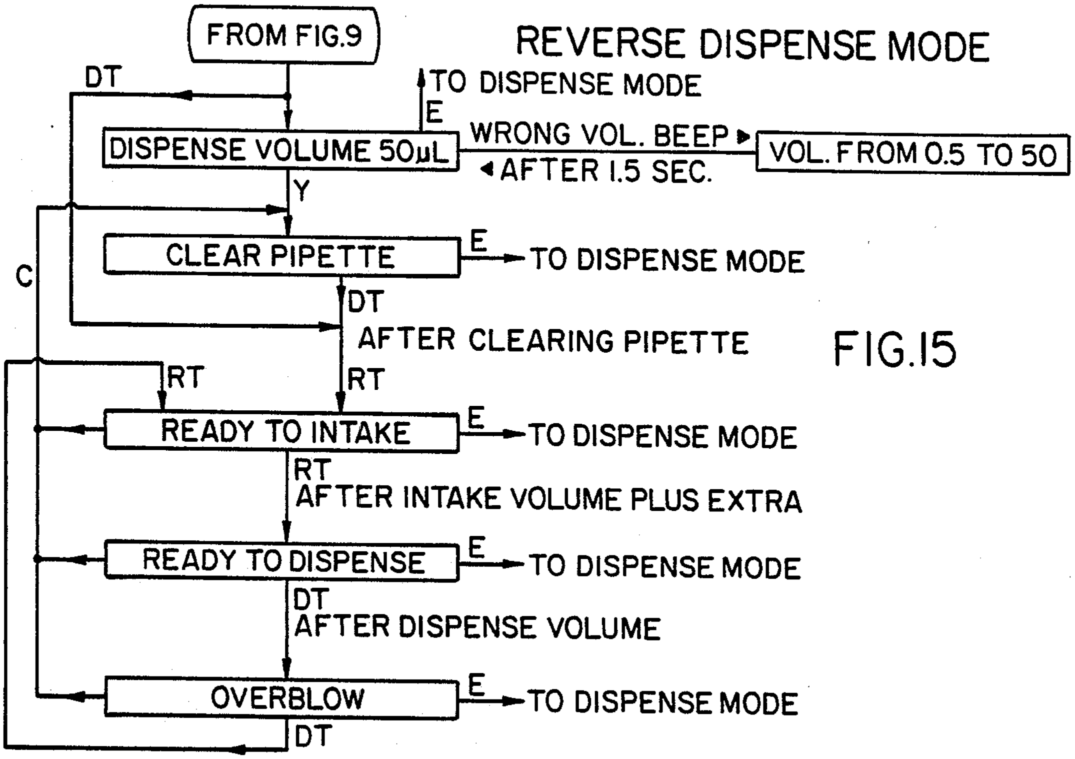

The reverse dispense program flow chart is shown in FIG. 15. This is very similar to the forward dispense program of FIG. 10, but it contains one additional step or operation to discharge the excess liquid that remains in the pipette tip after the desired volume has been dispensed. Thus, after the desired volume of liquid is dispensed, trigger 86 is again depressed and released to discharge the excess liquid after which the pipette is ready to repeat the cycle of aspirating and dispensing a liquid.

It is to be emphasized that the additional stepping of motor 61 to achieve the overblow effect in forward dispensing, and to aspirate an extra volume of liquid and its subsequent discharge in reverse dispensing, is automatically effected by the applicable program, and does not require any conscious effort on the part of the technician other than to select either the forward dispensing or the reverse dispensing mode of pipette operation.

In addition to the fixed programs provided for the pipette system as embodied in controller 106 and described in connection with FIGS. 8 to 15, the system is capable of having custom specified programs keyed into controller 106 by a technician who may be performing a repetitive routine differing from the usual pipetting tasks. Such a program can be stored in controller 106 until superseded, and it can be called up simply by actuating program key 100 and the numeric key for the program number assigned to the program.

Figure 16:
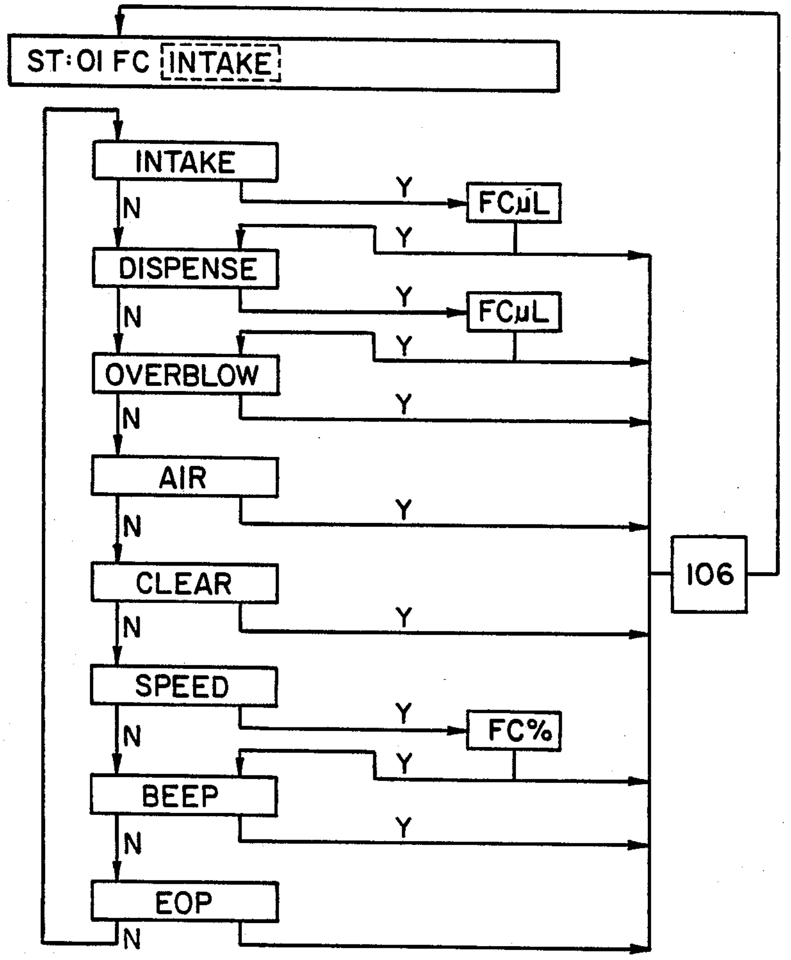

Reference is made to FIG. 16 for a description of the sequence of key operations needed to establish a custom specified program. The program mode can be entered by actuation of "no" key 101 as each of the preceding program mode indications appear on display 15 (see FIG. 9), or it can be entered directly by actuating "Prog" key 100, or by actuating numeric key "5". Display 15 then will read "PGM ?FC" where PGM is an abbreviation for the word program and the letters "FC" are used, in this description, to represent a flashing cursor which appears on the display. Thus, the display is asking the technician to enter the desired program number. If the technician enters a program number and there is a program stored in controller 106 for that number, display 15 will read "PGM 2 1000 uL." to indicate that the program has been specified for a 1000 uL. pipette. When the "yes" key 102 is actuated, the display shifts to "PGM 2 1000 uL. FC: Run". It is assumed, of course, that the technician knows what program 2 is since he probably had specified or written the program and entered it into controller 106. The program description or its source, e.g., the initials of the technician who may have written and stored the program, may be indicated on writing surface 16. If the technician Wishes to run program 2, he simply actuates "yes" key 102, whereupon display 15 will sequentially go through the steps of the program starting with the display "Clear pipette". The steps of program 2 pipette operating mode will each be initiated by actuation of pipette trigger 86 as described in connection with the program operating modes illustrated in FIGS. 10 to 13.

However, the technician does not have to run program 2. He can actuate "no" key 101 instead of the "yes" key as above indicated, whereupon display 15 will change to "PGM 2 1000 uL. FC: Edit". If he wishes to edit or modify the stored program 2 he will then actuate the "yes" key 102 and thereafter edit or modify the program as the sequence of the steps in the program are shown on display 15. Editing of an existing program is similar to the writing or specifying of a new program which will be described hereinafter. If he does not wish to edit program 2, he will actuate "no" key 101 and the display will then query "PGM 2 1000 uL. FC: Clear". If the "yes" key is then actuated, controller 106 will be cleared of program 2 and the display will then read "PGM 2 Empty FC: New". If, however, the technician did not wish to clear or erase program 2 from controller 106 and indicated this by actuating "no" key 101 when the display read "PGM 2 1000 uL. FC: Clear", the display would cycle through the "run", "edit", "Clear" options until the technician selects one of the three options or exits from the cycling of options for program 2 by actuating "exit" key 103. Actuation of the "exit" key simply restores operation of the system to the start of the program mode where display 15 asks for the selection of a program number.

Assume that the technician knows that there are three special programs stored in controller 106 identified as PGM 1, PGM 2, and PGM 3, and that he wishes to specify and store his own program. To do so, when display 15 reads "PGM ? FC", he will actuate numeric key "4" to cause the display to read "PGM 4 Empty FC: New". Actuation of the "yes" key will then start a series of display queries followed by the technician's "yes" or "no" or data responses, at the end of which a new program 4 will be stored in controller 106.

It might be noted at this time that the writing or specifying of a new program would be the same as clearing a previously stored program, e.g., program 3, and then specifying a new program 3, it is just that prior to specifying a new program e.g., program 4, no previous program 4 existed.

Thus, if we assume that the technician has responded to the display "PGM 4 Empty FC: New" by actuating the "yes" key, the display will change to read "ST: 01 FC Intake uL." This display is interpreted as step 1, and the flashing cursor to query if a liquid intake is to be the first step in the new program. Actuation of the "yes" key causes the cursor shift its position so as to query what the volume of the intake should be. Thus, display 15 will read "ST: 1 Intake ?FC uL." and the technician actuates the numeric keys to specify the volume of the intake, e.g., 500 uL. The display will then read "ST: 1 Intake 500 uL." Actuation of the "yes" key causes the display to call for the writing of the second step in the new program by reading "ST: 2 FC Intake uL." If the display query indicated by the flashing cursor is answered in the negative, the display will scroll through the following sequence of options until the "yes" key is actuated to select one of the options. Those options are Intake, Dispense, Overblow, Air, Clear, Speed, Beep, and End of Program (EOp).

When a pipette operation requiring a volume input is selected, the flashing cursor will move to request the numeric input for that volume. Thus, if a dispense step has been selected, the display will read "ST: 2 Dispense ?FC uL." The technician can then input a volume, e.g., 200, to cause the display to read "ST: 2 Dispense 200 uL." Actuation of the "yes" key will then cause display to read "ST: 3 FC Intake uL." Scrolling of possible program options will take place as above indicated until the desired option appears on display 15, after which the technician will actuate the "yes" key. Volume data is only required for an intake or a dispense operation. The volume of an air bubble to separate two liquid samples is fixed as previously mentioned so selection of the "air" option does not require any numeric input to specify the volume of the air bubble. A "speed" option and numeric input therefor is required only when the intake or dispensing speed is to be less than 100% of the normal speed for those operations. A "beep" may be desired in a programmed mode of pipette operation to alert the technician for some reason. A newly written program is terminated by an affirmative response to the query "ST: n FC EOP".

To more specifically describe the writing of a new program it will be assumed that two liquid samples are to be mixed and diluted with a diluent. The sequence of displays and key actuations may be as follows: "ST: 1 FC Intake uL." followed by actuation of the "yes" key; "ST: 1 Intake ?FC uL." followed by actuation of numeric keys to represent a diluent volume, e.g., 500; "ST: 1 Intake 500 uL." followed by actuation of the "yes" key; "ST: 2 FC Intake uL." followed by actuation of "no" key 101 until the display reads "ST: 2 FC Air" followed by actuation of the "yes" key; "ST: 3 FC Intake uL." followed by actuation of the "yes" key; "ST: 3 Intake ?FC uL." followed by actuation of numeric keys to represent a volume, e.g., 25; "ST: 3 Intake 25 uL." followed by actuation of the "yes" key; "ST: 4 FC Intake uL." followed by actuation Of the "no" key until the display reads "ST: 4 FC Air" followed by actuation of the "yes" key; "ST: 5 FC Intake uL." followed by actuation of the "no" key until the display scrolls to read "ST: 5 FC Beep" followed by actuation of the "yes" key; "ST: 6 FC Intake uL." followed by actuation of the "no" key until the display scrolls to read "ST: 6 FC Speed %" followed by actuation of the "yes" key; "ST: 6 Speed FC " followed by actuation of the numeric keys for a value of, e.g., 75; "ST: 6 Speed 75%" followed by actuation of the "yes" key; "ST: 7 FC Intake uL." followed by actuation of the "yes" key; "ST: 7 Intake ?FC uL." followed by actuation of the numeric keys, e.g., 100; "ST: 7 Intake 100 uL." followed by actuation of the "yes" key; "ST: 8 FC Intake uL." followed by actuation of the "no" key until the display scrolls to read "ST: 8 FC Dispense uL." followed by actuation of the "yes" key; "ST: 8 Dispense ? FC uL." followed by actuation of the numeric keys representing a volume of 665 uL. (total of all intakes including the fixed air bubbles of 20 uL. each); "ST: 8 Dispense 665 uL." followed by actuation of the "Yes" key; "ST: 9 FC Intake uL." followed by actuation of the "no" key until the display scrolls to read "ST: 9 FC Overblow" followed by actuation of the "yes" key; "ST: 10 FC Intake uL." followed by actuation of the "no" key until the display scrolls to "ST: 10 FC EOP" followed by actuation of the "yes" key, at which time the entire program is stored in controller 106.

To summarize the operation of the pipette in response to the program just outlined, the first actuation of the pipette trigger results in the aspiration of 500 uL. of diluent into the pipette tip. The next actuation of the trigger results in the aspiration of the fixed volume air bubble. Next, 25 uL. of a first sample is aspirated followed by a second air bubble. The next actuation of the pipette trigger results in an audible beep to alert the technician that the next aspiration will be from a second sample and, because that sample may contain sediment, that the aspiration of the second sample will be at a speed 75% of normal aspiration speed. The next actuation of the pipette trigger will aspirate 100 uL. of the second sample. The pipette tip is thus filled with 500 uL. of diluent, 25 uL. of the first sample, and 100 uL. of the second sample, with a 20 uL. air bubble separating the diluent from the first sample, and a similar air bubble separating the first sample from the second sample. The next operation of the pipette trigger results in the dispensing of the entire contents of the pipette tip. Another actuation of the pipette trigger causes an overblow operation to assure that all of the liquid has been dispensed from the pipette tip.

It should be clear from the foregoing description that a program comprising any combination of pipette operations can be written or specified. The number of steps in any one program and the total number of steps in a plurality of programs will be limited only by the memory capacity of controller 106 or an external computer to which controller 106 may be connected.

When control unit 11 is disconnected from its power source by operation of the on-off power switch, or operation of he pipette system is changed from one program mode to another, all programs are retained in the memory of controller 106 in the form and with the parameters and values previously set for the programs. Thus, all programs stored in controller 106 are retained in their stored form until edited, or cleared from the controller.

Having thus described the invention it is clear that many changes may be made to the described embodiment thereof, and that many other apparently different embodiments may be provided without departing from the spirit and scope of the invention. For example, a D.C. motor with an optical encoder could be used instead of a stepping motor, or the nozzle assembly could employ a ceramic piston in place of the stainless steel one described. Instead of a magnet array 60 and Hall Effect switches to indicate the volume capacity of a nozzle assembly, other coding and detector arrangements could be provided. Therefore, it is intended that the foregoing description and the accompanying drawing be interpreted as illustrative and not in a limiting sense.

What is claimed is:

1. A programmable pipette comprising: a pipette assembly including piston means movable between a home position wherein it is ready to intake a volume of liquid and a discharge position wherein it is ready to dispense a volume of liquid previously aspirated into said assembly; a motor drive assembly connectable to said pipette assembly and including motor means for moving said piston means between the home and the discharge positions, and switch means connected to a control unit for controlling actuation of said motor means; and a programmable control unit including microprocessor means pre-programmed for controlling said motor means to move said piston means between said home and said discharge positions in a plurality of modes of pipette operation, said microprocessor means also being programmed to display individual pipetting steps to enable a new program to be written to define a new pipette operating mode, keyboard means for keying information into said microprocessor means, and display means for displaying information stored in said microprocessor means requiring the input of information from said keyboard means to select one of said pre-programmed modes of pipette operations and information keyboarded into said microprocessor means to enable said microprocessor means to control said motor means to perform in response to actuation of said switch means according to a pre-programmed mode of pipette operation, said display means also displaying the individual pipetting steps requiring the input of information from said keyboard means to enable a new program defining a mode of pipette operation to be written and stored in said microprocessor means.

2. A programmable pipette according to claim 1 wherein said microprocessor means is programmed to drive said motor means at a predetermined rate, and including means to enable said programmed rate to be modified.

3. A programmable pipette according to claim 2 wherein the rate at which said motor means is driven during aspiration of a liquid is modified.

4. A programmable pipette according to claim 2 wherein the rate at which said motor means is driven during discharge of a liquid is modified.

5. A programmable pipette according to claim 1 wherein said microprocessor means is programmed to aspirate a volume of liquid greater than a programmed volume when data is input to said microprocessor means indicating that a volume dispensed is less than the programmed volume.

6. A programmable pipette according to claim 1 wherein when programming said microprocessor means for a new mode of pipette operation said display means sequentially displays a pipetting operating step and stores said operating step when information is keyed into said microprocessor means indicating that the displayed step is required for the new program.

7. A programmable pipette according to claim 6 wherein the pipetting steps include a liquid intake or aspirating step, a liquid dispensing step, and an end of program step.

8. A programmable pipette according to claim 7 wherein said microprocessor is programmed to display a question as to liquid volume when an aspirating or a dispensing step is selected as a step in the new program and to store the numeric value of the actual volume when said value is keyed in by said keyboard means.

9. A programmable pipette according to claim 7 wherein said microprocessor means is programmed to display a question as to the rate of aspirating or dispensing a liquid and to store the numeric value of the desired rate when said value is keyed in by said keyboard means.

10. A programmable pipette according to claim 7 wherein the steps of pipette operation include a step to intake an air bubble.

11. A programmable pipette according to claim 7 wherein the steps of pipette operation include an overblow step and a clear pipette step.

12. A programmable pipette comprising: a pipette assembly including piston means movable between a home position wherein it is ready to intake a volume of liquid and a discharge position wherein it is ready to dispense a volume of liquid previously aspirated into said assembly; a motor drive assembly connectable to said pipette assembly and including motor means for controlling movement of said piston means between the home and the discharge positions, and switch means for connecting said motor means to an electrical control unit; and a control unit means including microprocessor means for controlling said motor means to move said piston means between said home and discharge positions to perform pre-programmed modes of pipette operation, keyboard means for selecting one of said pre-programmed modes of pipette operation and for keying into said microprocessor means numeric data for liquid volumes to be aspirated and dispensed, and display means for displaying information stored in said microprocessor means requesting the input of data from said keyboard means and displaying said input data, said microprocessor means being programmed to display information requesting a data input concerning the rate at which a liquid is to be aspirated.

13. A programmable pipette according to clam 12 wherein said microprocessor means is programmed to display information requesting a data input concerning the rate at which a liquid is to be dispensed.

14. A programmable pipette comprising: a pipette assembly including piston means movable between a home position wherein it is ready to intake a volume of liquid and a discharge position wherein it is ready to dispense a volume of liquid previously aspirated into said assembly; a motor drive assembly connectable to said pipette assembly and including motor means for controlling movement of said piston means between the home and the discharge positions, and switch means for connecting said motor means to an electrical control unit; and a control unit including microprocessor means for controlling said motor means to move said piston means between said home and said discharge positions to perform pre-programmed modes of pipette operation, keyboard means for selecting one of said pre-programmed modes of pipette operation and for keying into said microprocessor means numeric data for liquid volumes to be aspirated and dispensed, and display means for displaying information stored in said microprocessor means requesting the input of data from said keyboard means and displaying said input data, said microprocessor means being programmed to request data input concerning the nominal value of a liquid volume to be aspirated and dispensed and the actual volume of the liquid dispensed, and then computing and storing the calibration factor to effect the aspiration of a liquid volume greater than the nominal value so that an actual volume equal to the nominal value is dispensed.

15. A pipette comprising: a pipette assembly including piston means movable between a home position wherein it is ready to intake a volume of liquid and a discharge position wherein it is ready to dispense a volume of liquid previously aspirated into said piston assembly; a motor drive assembly including a motor means for controlling movement of said piston means between its home and discharge positions; a control means including microprocessor means for controlling said motor means, wherein said motor means is a pulse actuated motor means that includes a longitudinally movable shaft means for engaging said piston means to drive it in a liquid dispensing direction, said shaft means being provided with magnet means and said motor drive means being provided with Hall Effect switch means so that when said magnet means activates said Hall Effect switch means said microprocessor means is signaled that said piston means is in its home position, and all subsequent movements of said piston means are controlled by the number of pulses fed to said motor means after said microprocessor means is signaled that said piston means is in its home position.

16. A pipette comprising: a pipette assembly including piston means movable between a home position wherein it is ready to intake a volume of liquid and a discharge position wherein it is ready to dispense a volume of liquid previously aspirated into said assembly; a motor drive assembly including motor means for controlling movement of said piston means between its home and discharge positions; and a control unit including microprocessor means for controlling said motor means, keyboard means for keying information into said microprocessor means, and display means for displaying information stored in said microprocessor means requiring the input of information from said keyboard means as to the nominal volume of liquid to be aspirated and dispensed and the actual volume of liquid dispensed, said microprocessor means including calibrating means for determining a calibration factor substantially equal to the ratio of the nominal volume of a liquid to be aspirated to the actual volume of the liquid dispensed so that thereafter the pipette will aspirate an actual volume of liquid equal to the nominal volume to be aspirated multiplied by the calibration factor.

17. A pipette according to claim 16 wherein said display means displays information as to the calibration factor and a calibration factor known for a particular liquid can be keyed directly into said microprocessor means from said keyboard means.

* * * * *